(12) United States Patent
Eltrop (10) Patent No.: US 11,529,930 B2
(45) Date of Patent: Dec. 20, 2022

(54) MOTOR VEHICLE WIPER AND MOTOR VEHICLE EQUIPPED THEREWITH

(71) Applicant: Bayerische Motoren Werke Aktiengesellschaft, Munich (DE)

(72) Inventor: Raphael Eltrop, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 16/431,996

(22) Filed: Jun. 5, 2019

(65) Prior Publication Data
US 2019/0283713 A1 Sep. 19, 2019

Related U.S. Application Data

(63) Continuation of application No. PCT/EP2018/053794, filed on Feb. 15, 2018.

(30) Foreign Application Priority Data

Feb. 22, 2017 (DE) ...................... 10 2017 202 876.9

(51) Int. Cl.
*B60S 1/34* (2006.01)
*B60S 1/58* (2006.01)
*B60S 1/04* (2006.01)

(52) U.S. Cl.
CPC .............. *B60S 1/342* (2013.01); *B60S 1/349* (2013.01); *B60S 1/583* (2013.01); *B60S 1/0402* (2013.01); *B60S 1/0463* (2013.01)

(58) Field of Classification Search
CPC .......... B60S 1/583; B60S 1/32; B60S 1/3459; B60S 1/342; B60S 1/34; B60S 1/16; B60S 1/349; B60S 1/04; B60S 1/3427; B60S 1/3461

USPC .............. 15/250.21, 250.351, 250.3, 250.34, 15/250.19, 250.16
See application file for complete search history.

(56) References Cited

U.S. PATENT DOCUMENTS

| 5,570,923 | A | 11/1996 | Taylor | |
|---|---|---|---|---|
| 5,819,363 | A | 10/1998 | Siegel et al. | |
| 8,510,896 | B2 * | 8/2013 | Baik | B60S 1/342 |
| | | | | 15/250.31 |
| 2002/0152573 | A1 * | 10/2002 | Tsukui | B60S 1/44 |
| | | | | 15/250.3 |
| 2009/0172908 | A1 * | 7/2009 | Tang | B60S 1/0466 |
| | | | | 15/250.16 |

(Continued)

FOREIGN PATENT DOCUMENTS

| CN | 102555998 A | 7/2012 |
|---|---|---|
| CN | 104149745 A | 11/2014 |
| CN | 104494573 A | 4/2015 |

(Continued)

OTHER PUBLICATIONS

International Search Report (PCT/ISA/210) issued in PCT Application No. PCT/EP2018/053794 dated May 29, 2018 with English translation (six (6) pages).

(Continued)

*Primary Examiner* — Katina N. Henson
(74) *Attorney, Agent, or Firm* — Crowell & Moring LLP (57) ABSTRACT

A motor vehicle wiper has a wiper arm with a wiper blade and is in operative connection with a wiper shaft. The wiper arm is fastened on a bearing part that is movably supported on the wiper shaft.

7 Claims, 5 Drawing Sheets

(56) References Cited

U.S. PATENT DOCUMENTS

2012/0317739 A1   12/2012  Rapp
2013/0145570 A1    6/2013  Balk

FOREIGN PATENT DOCUMENTS

| DE | 44 42 527 C1 | 12/1995 | |
|----|---|---|---|
| DE | 103 24 277 A1 | 3/2005 | |
| FR | 2 821 907 A1 | 9/2002 | |
| FR | 2821907 A1 * | 9/2002 | ............. B60S 1/342 |
| KR | 10-2013-0064395 A | 6/2013 | |
| WO | WO 99/19188 A1 | 4/1999 | |

OTHER PUBLICATIONS

German-language Written Opinion (PCT/ISA/237) issued in PCT Application No. PCT/EP2018/053794 dated May 29, 2018 (five (5) pages).

German-language Search Report issued in counterpart German Application No. 102017202876.9 dated Jan. 23, 2018 with partial English translation (13 pages).

English-language Chinese Office Action issued in Chinese application No. 201880004643.X dated Nov. 25, 2021 (Six (6) pages).

* cited by examiner

MOTOR VEHICLE WIPER AND MOTOR VEHICLE EQUIPPED THEREWITH

CROSS REFERENCE TO RELATED APPLICATIONS

This application is a continuation of PCT International Application No. PCT/EP2018/053794, filed Feb. 15, 2018, which claims priority under 35 U.S.C. § 119 from German Patent Application No. 10 2017 202 876.9, filed Feb. 22, 2017, the entire disclosures of which are herein expressly incorporated by reference.

BACKGROUND AND SUMMARY OF THE INVENTION

The present invention relates to a motor vehicle window wiper having a wiper arm, which is operatively connected to a wiper shaft, and a wiper blade, and to a correspondingly equipped motor vehicle.

DE 44 42 527 C1 has disclosed a motor vehicle window wiper having a wiper arm and a wiper blade which is fastened to the latter. The wiper blade is mounted in an axially fixed manner along a longitudinal axis in a sleeve which is provided on the wiper arm, in order to bear with defined prestress against a window with a constant curvature radius. For the purpose of changing the wiper blade, it is disadvantageously necessary to pivot the wiper arm about a pivot axis which is provided orthogonally with respect to the longitudinal axis and spaced apart to a great extent from the latter. As can be gathered, in particular, from FIG. 5 of DE 44 42 527 C1, the known motor vehicle window wiper is likewise disadvantageously of large overall design.

It is an object of the present invention to overcome the abovementioned disadvantage.

The motor vehicle window wiper according to the invention comprises a wiper arm which is operatively connected to a wiper shaft and has a wiper blade. To this end, the wiper arm is arranged on a bearing part which is mounted movably on the wiper shaft. Here, the connection of the bearing part and the wiper shaft is set up in such a way that a movement between the abovementioned elements for the purpose of the removal or attachment of the wiper arm (that is to say, in a changing position) is made possible, whereas a movement of the abovementioned elements in a rest position (that is to say, in the case of non-operation) or in an operating position (that is to say, during a wiping movement) of the motor vehicle window wiper is substantially ruled out. It is to be noted, however, that tracking of the wiper blade on the surface of the window to be cleaned is nevertheless made possible in the operating position. In this way, a motor vehicle window wiper of small overall size is advantageously provided, the wiper blade of which can be fastened and/or removed in a simple and comfortable way, which wiper blade bears against the window with a constant contact pressure in the operating position.

In accordance with one preferred embodiment, the motor vehicle window wiper according to the invention comprises a wiper arm which is operatively connected to a wiper shaft and has a wiper blade. The wiper arm is arranged on a bearing part which for its part is mounted on the wiper shaft such that it can be displaced axially between an operating position of the motor vehicle window wiper and a changing position which permits changing of the wiper blade. Furthermore, the bearing part is mounted on the wiper shaft in a radially fixed manner in the operating position and in a radially adjustable manner in order to assume the changing position. As a consequence, an apparatus is provided which is advantageously of smaller overall design than the apparatus which is known from the prior art.

In accordance with a further preferred embodiment, the bearing part is configured as a sleeve which partially surrounds the wiper shaft both in the operating position and the changing position. As a result, it is advantageously possible to further decrease the required installation space.

In principle, the axial and/or radial adjustment or setting of the bearing part can be performed manually. In order to facilitate this undertaking, a locking device which limits the axial and/or radial movement of the bearing part is advantageously provided, which locking device limits the setting movement of the bearing part and its axial adjustment travel and/or its radial pivoting angle.

In order to further decrease the required installation space of the motor vehicle window wiper and for precise guidance of the bearing part on the wiper shaft in order to assume the changing position or in order to move back out of said changing position, the locking device is operatively connected at least in sections to the sleeve in a positively locking manner. The positively locking connection is configured in such a way that it permits the axial and radial movement of the bearing part in order to assume the operating position and the changing position. In a particularly advantageous way, the locking device and that section of the sleeve which surrounds it and permits an axial displaceability are of complementary configuration in the manner of a shaft/hub connection, in particular with a sliding key, a splined shaft, a spline shaft, a serrated shaft and/or a polygonal shaft. These permit the axial displacement, but prevent a radial movement of the bearing part in the abovementioned section, with the result that a rotational movement of the wiper arm, which rotational movement is brought about by way of the wiper shaft, is made possible during operation of said wiper arm. In order to make a radial movement of the bearing part in the changing position possible, it is provided that the complementary configuration in the manner of a shaft/hub connection of the sleeve and the wiper shaft is canceled, in particular by way of suitable lengths and/or positions of said sleeve and wiper shaft.

In accordance with one preferred embodiment, the locking device has a profile which is configured transversely with respect to the longitudinal axis of the wiper shaft and on which a first section which is situated in the sleeve and a second section are guided axially displaceably, and a third section which is situated between said first and second sections is guided axially and rotationally. The wiper shaft is of complementary configuration with respect thereto. The previous comments which relate to the shaft/hub connection apply correspondingly to that part of the profile which permits an axial displacement and/or radial movement. A defined adjustment travel of the bearing part with a small amount of installation space is advantageously made possible by way of said preferred arrangement.

This applies all the more so if, as viewed transversely with respect to the longitudinal axis of the wiper shaft, the profile has at least a first receiving section and a second receiving section, the first receiving section being operatively connected to the first section of the sleeve in a positively locking manner in the operating position, and the second receiving section being operatively connected to the second section in a positively locking manner in the changing position.

Guidance of particularly simple design of the sleeve with respect to the above-disclosed bearing part is advantageously achieved if the sleeve has at least one projection which engages into the first receiving section in the operating position and into the second receiving section in the changing position.

In accordance with one preferred embodiment, a prestressing device is provided which is operatively connected to the bearing part and prestresses it in the changing position. It is to be noted that said prestressing device can be set up, in particular, as a helical spring and can be arranged in the sleeve in such a way that it is unloaded in the operating position and is prestressed merely in the case of assuming the changing position and during said changing position. It is cumulatively possible that the prestressing device also acts on the bearing device in the operating position, in order to prestress the wiper arm against the window.

In accordance with one preferred embodiment, the wiper blade is received at least partially in a receptacle of the bearing part. As a result, particularly simple changing of the wiper blade is made possible.

The abovementioned object is likewise achieved by way of a motor vehicle having at least one motor vehicle window and a drive which is operatively connected to a wiper shaft, which motor vehicle has at least one motor vehicle window wiper of the above-disclosed type. The abovementioned advantages apply appropriately.

In the following text, a detailed, non-prejudicial, in particular non-restrictive, description of exemplary embodiments of the present invention is made with reference to the appended figures which are not to scale. Identical elements are provided with identical designations unless indicated otherwise.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
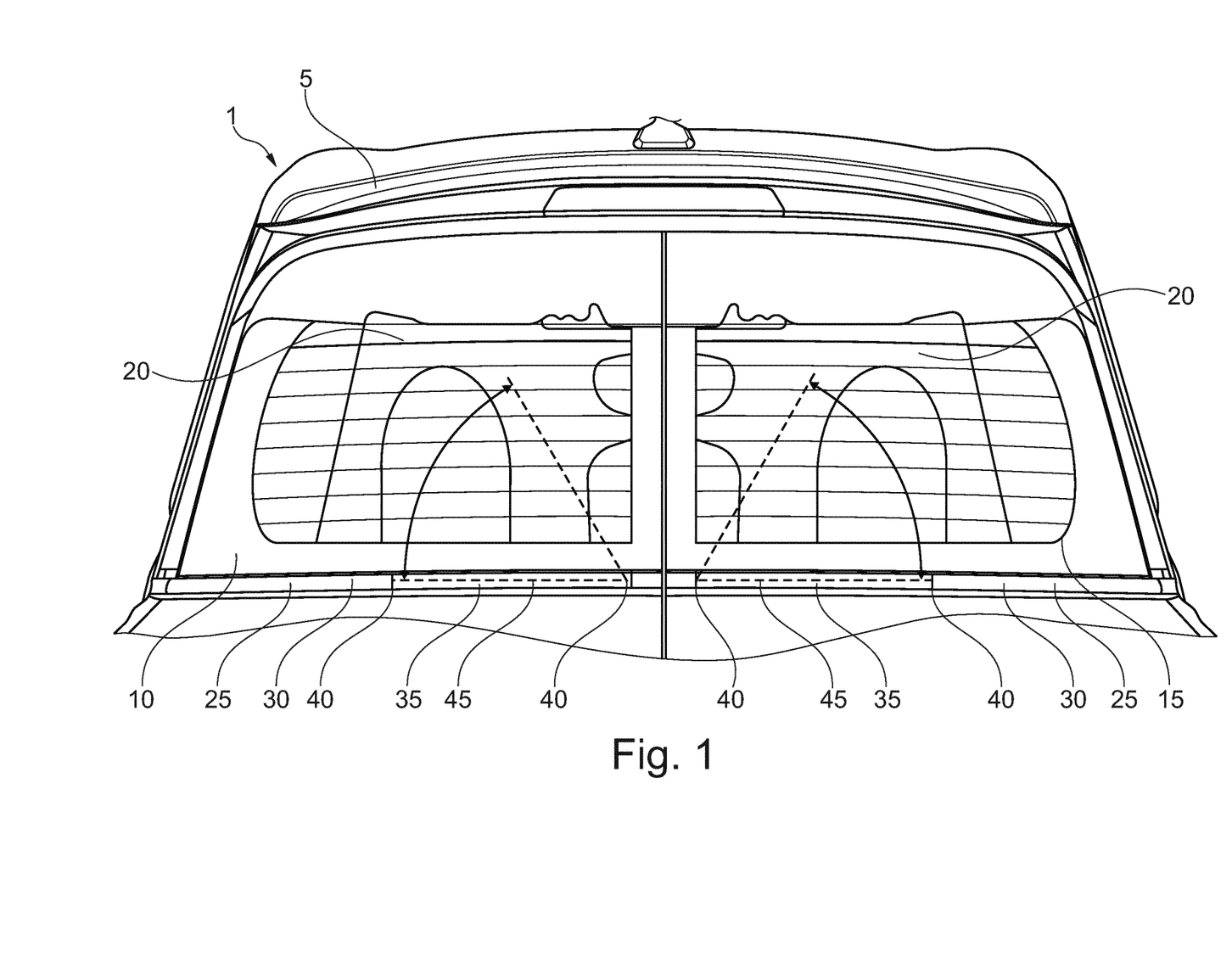
FIG. 1 is a diagrammatic rear view of a partially illustrated motor vehicle according to the invention.

FIG. 1 shows a rear view of a motor vehicle 1 which has a left hand door 10 which is fastened to the vehicle body 5 on the left and a right hand door 15 which is fastened to the vehicle body 5 on the right. Each of the two doors 10 and 15 in each case has a window 20, at the respective lower edge of which a respective vehicle body part 25 is situated. In the exemplary embodiment which is shown here, the vehicle body part 25 is a frame 30 which is oriented substantially horizontally and extends from the left or right outer side of the window 20 into its center. Adjacently with respect to this, a cover 35 is provided which extends substantially in a visual extension to the frame 30 as far as into those sections of the left hand door 10 and the right hand door 15 which are adjacent with respect to one another. The covers 35, in particular their surfaces, correspond with regard to their visual configuration in each case to the frames 30, and form one visual unit with the latter. This visual unit is interrupted merely by way of gaps 40 which make a movement possible of the motor vehicle window wiper 45 into a use position, which motor vehicle window wiper 45 is situated here in the non-use position and is therefore covered by way of the covers 35. A possible movement (known per se) of the motor vehicle window wiper 45 is symbolized by way of the dashed lines.

Figure 2:
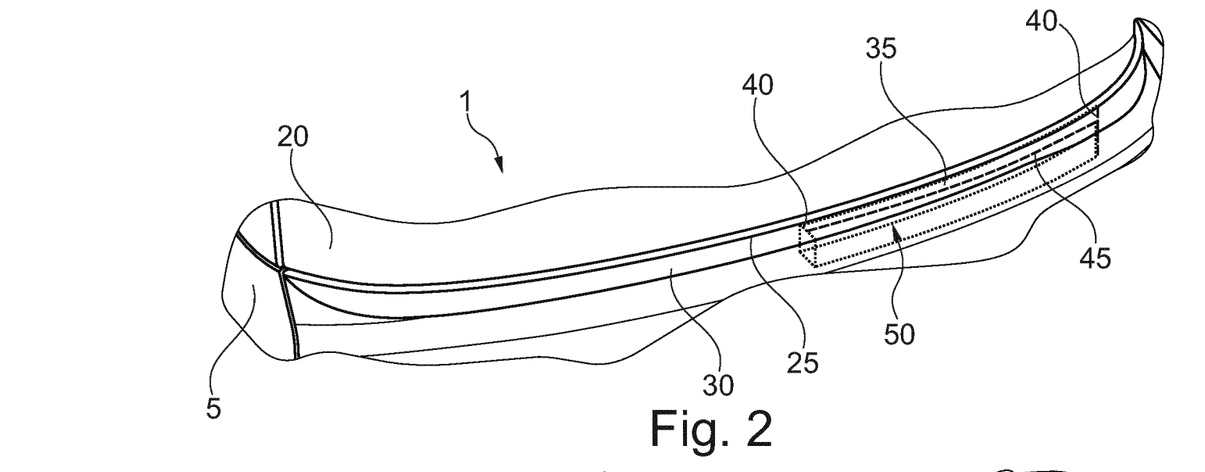
FIG. 2 is a perspective rear view of a partially illustrated motor vehicle according to the invention as an alternative to FIG. 1.

FIG. 2 shows an alternative embodiment (with respect to FIG. 1) of a motor vehicle 1, in the case of which merely a single motor vehicle window wiper 45, which is situated here in the non-use position, is provided. The window 20 is a rear window which is fastened rigidly to the vehicle body 5. The motor vehicle window wiper 45 is situated in a recess 50 which is arranged in the vehicle body part 25. The recess 50 is covered by way of a cover 35 which is situated on the motor vehicle window wiper 45.

Figure 3:
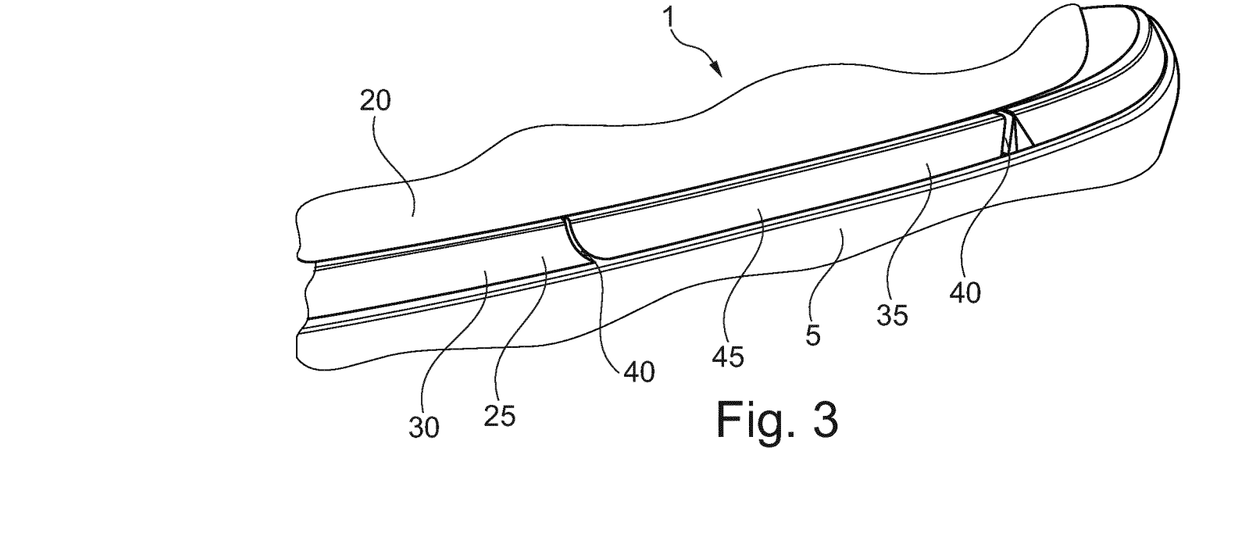
FIG. 3 is a perspective rear view of a partially illustrated motor vehicle according to the invention as an alternative to FIG. 1 and FIG. 2.

FIG. 3 shows a further alternative embodiment of a motor vehicle 1. The motor vehicle window wiper 45 is then also situated in the non-use position which is shown here on the window 20, without being received in a recess 50. Its cover 35 merges visually into the vehicle body part 25 which is configured as a frame 30, and is interrupted merely by way of the gaps 40.

Figure 4:
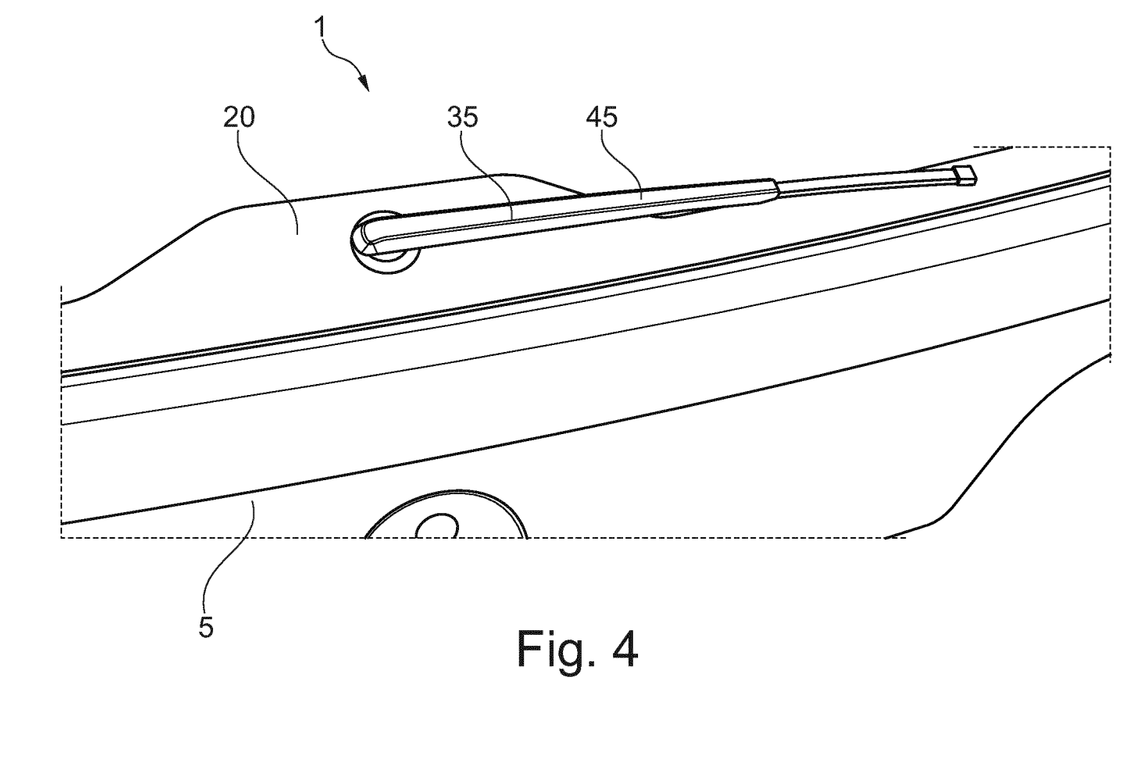
FIG. 4 is a perspective rear view of a partially illustrated motor vehicle according to the invention as an alternative to FIG. 1 to FIG. 3.

FIG. 4 shows an additional alternative embodiment of a motor vehicle 1, in the case of which a shorter cover 35 in comparison with the cover 35 which is shown in FIG. 3 is provided. In accordance with this exemplary embodiment, the motor vehicle window wiper 45 is connected to the window 20.

Figure 5:
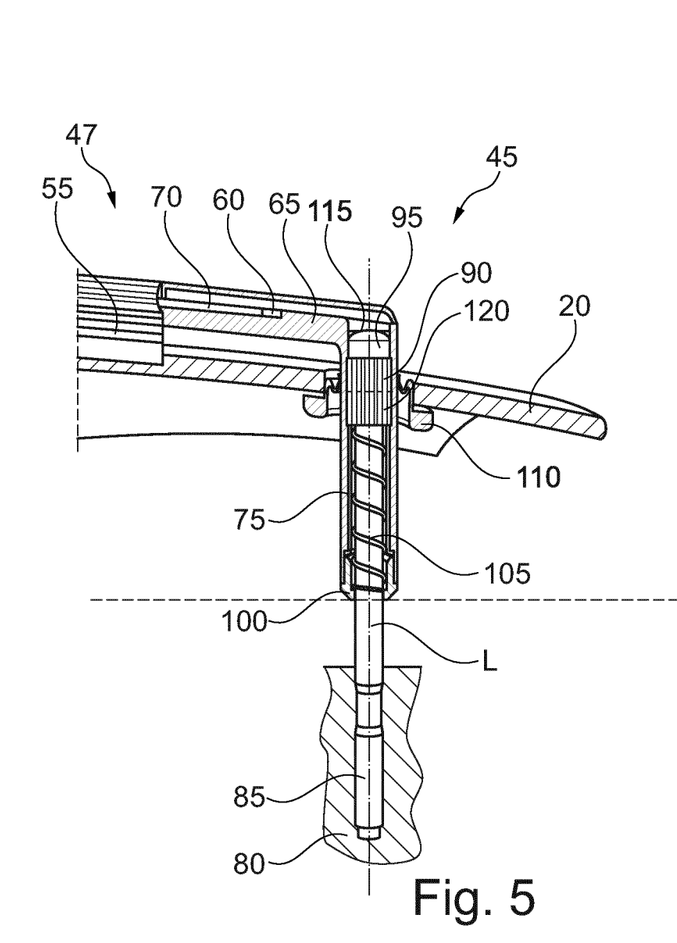
FIG. 5 shows a part of a motor vehicle window wiper according to the invention which is situated in the operating position, in a sectioned side view.

FIG. 5 shows a part of a motor vehicle window wiper 45 in a side view in section. The motor vehicle window wiper 45 is situated in the operating position, that is to say a wiper blade 55 which is situated on a wiper arm 47 bears against the window 20. With one end, the wiper blade 55 is fastened in a receptacle 60 of a bearing part 65. In the exemplary embodiment which is shown here, the fastening takes place in a positively locking manner by way of a tab 70 of the wiper blade 55 being plugged into the receptacle 60 of the bearing part 65. This is not absolutely necessary, however; rather, other mechanical fastening types can also be provided.

Figure 6:
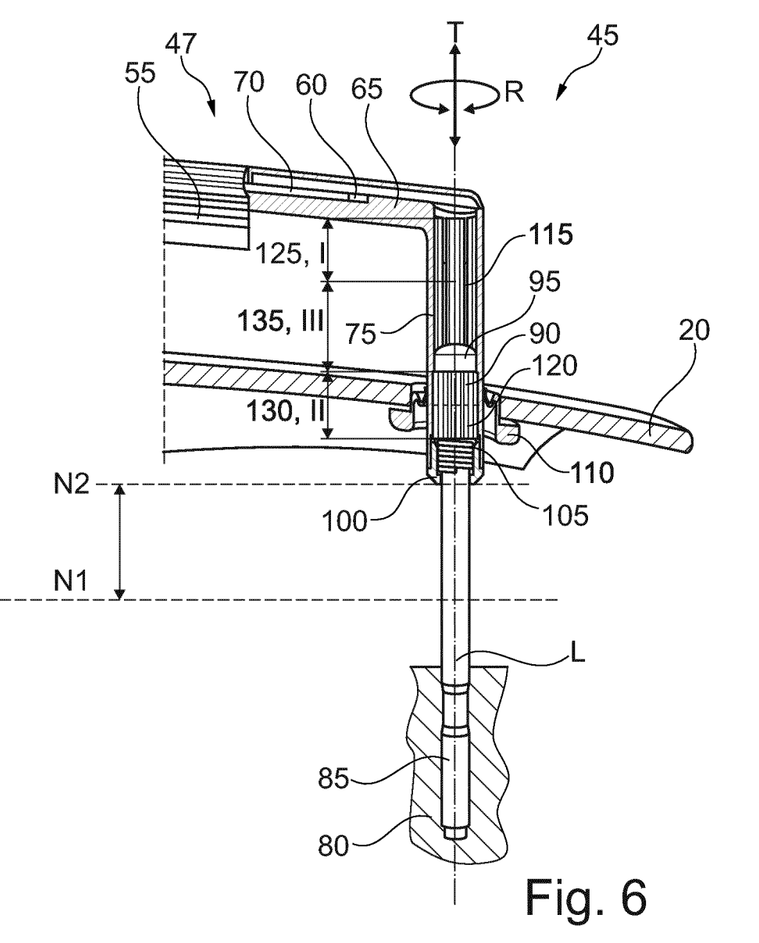
FIG. 6 shows the part which is illustrated in FIG. 5, in the changing position.
Figure 7:
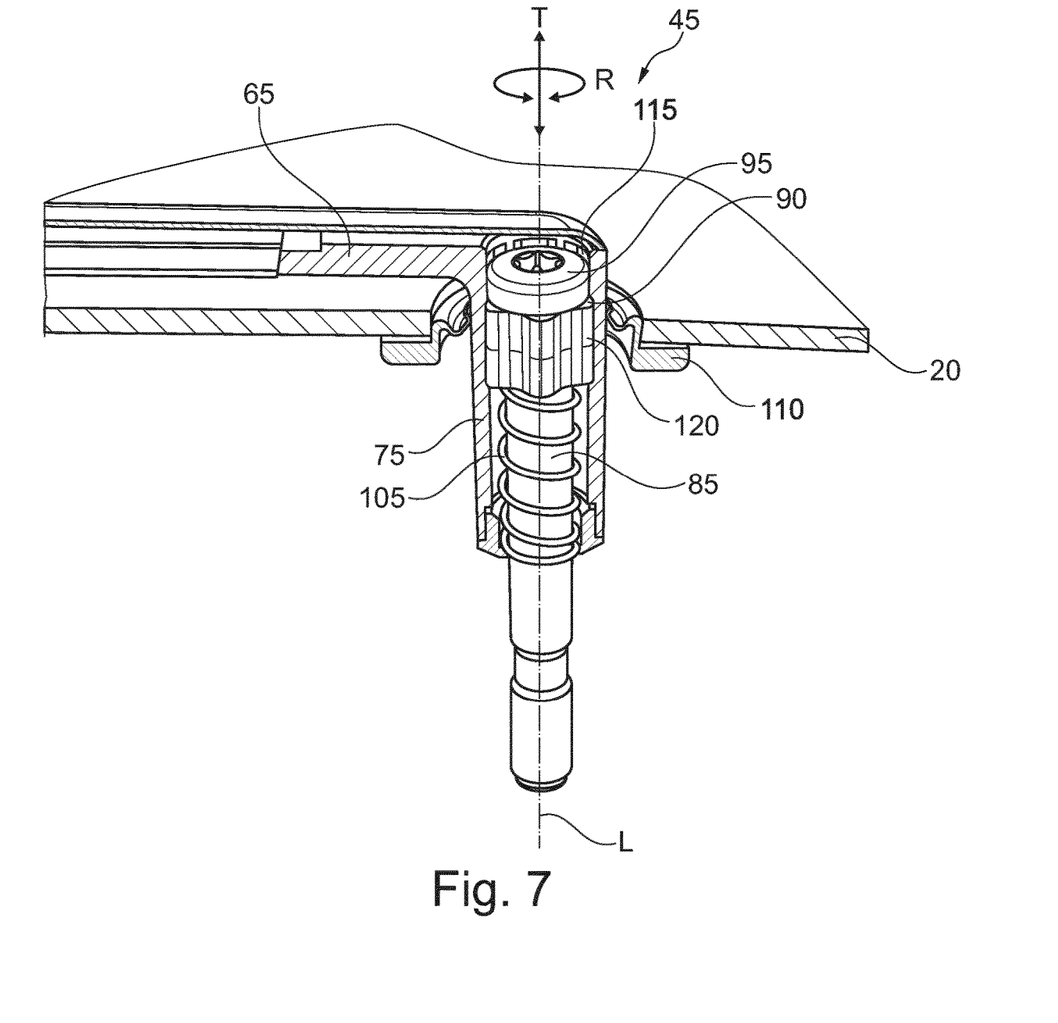
FIG. 7 shows an enlarged view of a bearing part which is situated in the operating position.

The bearing part 65 has a sleeve 75 which partially surrounds a wiper shaft 85 which is driven by way of a drive 80 which is known per se and is shown here merely symbolically, both in the operating position and in a changing position which is shown in FIG. 6. The wiper shaft 85 has a longitudinal axis L, around which the wiper arm is pivoted. At its end which lies opposite the drive 80, a locking device 90 is fastened by way of a screw 95 to the wiper shaft 85. The locking device 90 has a profiled cross section, as will be shown, in particular, with reference to FIG. 7. At its end which lies opposite the locking device 90, the sleeve 75 is closed by means of a closure element 100. A prestressing device 105 which is configured as a cylinder spring is arranged in a relieved state between the closure element 100 and the locking device 90 and so as to surround the corresponding section of the wiper shaft 85. A seal 110 is situated in the penetration region of the locking device 90 through the window 20, which seal 110 prevents an ingress of moisture in the direction of the drive 80 in a manner known per se.

In the operating position of the motor vehicle window wiper 45, the lower end of the sleeve 75 is situated at a level N1 which is symbolized by way of the dashed line which is oriented horizontally in FIG. 5. As can then be gathered from FIG. 6, the wiper arm 47 is axially displaceable along the longitudinal axis L of the drive 80 in the direction T and can be displaced as far as a level which is symbolized by way of N2 and in which it assumes its changing position. As a result of the axial movement of the wiper arm 47, the wiper blade 55 moves away from the window 20, with the result that it can be removed in a simple and comfortable way and a new wiper blade 55 (not shown here) can be fastened in the receptacle 60. As a result of a movement which is opposed with respect to the direction T, the wiper arm 47 can be returned into the operating position, in which the new wiper blade 55 bears against the window 20.

In order to facilitate the axial movement in the direction T and back, the locking device 90 is configured in the sleeve 75 in such a way that respectively corresponding grooves 115 and tongues 120 which extend in the longitudinal direction L interact as guide elements. Moreover, they transmit the torque which emanates from the drive 80 during the operation of the motor vehicle window wiper 45 to the wiper arm 47, with the result that a controlled movement of said wiper arm 47 is made possible. Furthermore, in the case of a movement of the sleeve 75 into the changing position, the prestressing device 105 is compressed, as a result of which a return movement from the level N2 to the level N1 is facilitated.

In addition to a translational movement of the sleeve 75, it can also be pivoted about the longitudinal axis L in a rotational direction R in designated positions, as a result of which the space which is available for changing of the wiper blade 55 is advantageously increased further and makes improved wiper blade changing comfort possible: in the operating position which is shown in FIG. 5, the locking device 90 is situated in a first section I of the sleeve 75, which first section I is adjacent with respect to the receptacle 60 and is configured as a first receiving section 125, said objects being configured such that they can be displaced with one another in the direction of the longitudinal axis L, but cannot be rotated with respect to one another about the longitudinal axis L. This likewise applies to a second section II of the sleeve 75, which second section II is configured as a second receiving section 130 and is situated at that end of the sleeve 75 which is remote from the first section I. A third region III which has a third receiving section 135 and permits a rotation of the sleeve 75 about the longitudinal axis L in the rotational direction R is situated between the first region I and the second region II or the first receiving section 125 and the second receiving section 130.

The length of said receiving sections 125, 130 and 135 and of the regions I, II and III is of substantially identical size. As an alternative, it can be provided that the length of the third section 135 or of the third region III is greater than the length of the respective other sections 125, 130 or regions I, II.

As a consequence, merely the following method steps are advantageously to be carried out for changing of a wiper blade 55:

1) Carrying out of a translational movement of the bearing part 65 or the sleeve 75 along the longitudinal axis L of the section I in the longitudinal direction T, said objects being guided axially by way of a combination of grooves 115 and tongues 120 which interact with one another in the sleeve 75 and the locking device 90. The translational movement is carried out until the section I is freed completely from the locking device 90 and has entered completely into the section III.

2) When the section I is freed completely from the locking device 90 and has entered completely into the section III, carrying out of a rotational movement of the bearing part 65 or the sleeve 75 from a starting position about the longitudinal axis L in the rotational direction R. Here, a rotation by an angle of substantially less than 90° is preferred. An angle of substantially 45°±15° is particularly preferred.

3) When the rotational movement is ended, removing of the wiper blade 55 and fastening of an alternative wiper blade 55.

4) When the alternative wiper blade 55 is fastened, reversing of the rotational movement counter to the rotational direction R and, as soon as the starting position in accordance with point (2) is reached, carrying out of a translational movement of the bearing part 65 along the longitudinal axis L and counter to the longitudinal direction T which is mentioned in point (1), in such a way that said bearing part 65 enters completely into the section II.

The motor vehicle window wipers 45 which are shown in FIGS. 1 to 7 are attached in each case in the rear regions of the motor vehicles 1. It goes without saying, however, that they can also be arranged in the front region of the motor vehicles 1.

LIST OF DESIGNATIONS

1 Motor vehicle
5 Vehicle body
10 Left hand door
15 Right hand door
20 Window
25 Vehicle body part
30 Frame
35 Cover
40 Gap
45 Motor vehicle window wiper
47 Wiper arm
50 Recess
55 Wiper blade
60 Receptacle
65 Bearing part
70 Tab
75 Sleeve
80 Drive
85 Wiper shaft
90 Locking device
95 Screw
100 Closure element
105 Prestressing device
110 Seal
115 Grooves
120 Tongues
125 First receiving section
130 Second receiving section
135 Third receiving section
L Longitudinal axis
R Rotational direction
T Longitudinal direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle window wiper, comprising:
a wiper shaft;
a wiper arm configured for a wiper blade;
a bearing part mounted movably on the wiper shaft in both an operating position of the motor vehicle window wiper and a changing position of the motor vehicle window wiper, wherein the changing position permits changing of the wiper blade and wherein the wiper arm is fastened to the bearing part;
a locking device, wherein an entirety of the locking device is disposed within a sleeve of the bearing part in both the operating position and the changing position; and
a prestressing device which is operatively connected to the bearing part, wherein the prestressing device is in a relieved state in the operating position and is compressed in the changing position.

2. The motor vehicle window wiper according to claim 1, wherein
the bearing part is mounted on the wiper shaft so as to be displaceable axially between the operating position of the motor vehicle window wiper and the changing position, and
the bearing part is mounted on the wiper shaft so as to be fixed radially in the operating position and movable radially in order to assume the changing position.

3. The motor vehicle window wiper according to claim 1, wherein
the sleeve partially surrounds the wiper shaft both in the operating position and the changing position.

4. The motor vehicle window wiper according to claim 1, wherein
the locking device is operatively connected at least in sections to the sleeve in a positively locking manner.

5. The motor vehicle window wiper according to claim 1, wherein
the locking device has a profile which is configured transversely with respect to the longitudinal axis of the wiper shaft, wherein the locking device is disposable in a first receiving section and a second receiving section of the sleeve such that the locking device and the first receiving section are axially displaceable with respect to one another but cannot be rotated with respect to one another and such that the locking device and the second receiving section are axially displaceable with respect to one another but cannot be rotated with respect to one another and wherein the locking device is disposable in a third receiving section of the sleeve which is situated between the first and second receiving sections such that the locking device and the third receiving section are axially displaceable with respect to one another and are rotatable with respect to one another.

6. The motor vehicle window wiper according to claim 1, wherein
the wiper blade is received at least partially in a receptacle of the bearing part.

7. A motor vehicle, comprising:
at least one motor vehicle window;
a motor vehicle window wiper according to claim 1; and
a drive operatively connected to the wiper shaft of the motor vehicle window wiper.

* * * * *